(12) United States Patent  (10) Patent No.: US 9,785,914 B2
Gupta et al.  (45) Date of Patent: Oct. 10, 2017

(54) COLLABORATIVE REVIEW APPARATUS, SYSTEMS, AND METHODS

(75) Inventors: Yash Kumar Gupta, Agra (IN); Rajeev Sharma, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 696 days.

(21) Appl. No.: 12/330,002

(22) Filed: Dec. 8, 2008

(65) Prior Publication Data

US 2014/0033068 A1  Jan. 30, 2014

(51) Int. Cl.
*G06F 3/048* (2013.01)
*G06Q 10/10* (2012.01)

(52) U.S. Cl.
CPC ................. *G06Q 10/103* (2013.01)

(58) Field of Classification Search
USPC ......................................................... 715/751
See application file for complete search history.

(56) References Cited

U.S. PATENT DOCUMENTS

| | | | |
|---|---|---|---|
| 5,671,428 A * | 9/1997 | Muranaga et al. | 715/751 |
| 6,173,317 B1 * | 1/2001 | Chaddha et al. | 709/219 |
| 6,342,906 B1 | 1/2002 | Kumar et al. | |
| 6,721,921 B1 | 4/2004 | Altman | |
| 7,890,405 B1 * | 2/2011 | Robb | 705/36 R |
| 2003/0214528 A1 * | 11/2003 | Pierce et al. | 345/723 |
| 2004/0085354 A1 * | 5/2004 | Massand | 345/751 |
| 2004/0122843 A1 * | 6/2004 | Terris et al. | 707/102 |
| 2006/0150079 A1 * | 7/2006 | Albornoz et al. | 715/512 |
| 2006/0282762 A1 * | 12/2006 | Diamond et al. | 715/511 |
| 2008/0005064 A1 * | 1/2008 | Sarukkai | 707/3 |
| 2009/0013246 A1 * | 1/2009 | Cudich et al. | 715/234 |
| 2009/0055413 A1 * | 2/2009 | Audet | 707/100 |
| 2009/0271450 A1 * | 10/2009 | Bush | 707/203 |
| 2010/0095198 A1 * | 4/2010 | Bultrowicz et al. | 715/234 |

* cited by examiner

*Primary Examiner* — Matthew Ell
(74) *Attorney, Agent, or Firm* — Shook, Hardy & Bacon, L.L.P.

(57) ABSTRACT

Apparatus, systems, and methods may operate to within the context of a shared document review process to receive an updated comment associated with an original comment by a comment series identifier. Further actions may include generating a comment differentiation identifier that serves to differentiate the updated comment from the original comment, and storing at least a portion of the updated comment and the comment differentiation identifier in a collaboration comment repository. Using stored document version history and a timeline, the state of the document at a particular point in time, and a history of the comment series can be rendered as a result. Additional apparatus, systems, and methods are disclosed.

22 Claims, 10 Drawing Sheets

```xml
<?xml version="1.0" ?>
- <rss version="2.0">
  - <channel>
      <title>Comments on AesopFables_Review.pdf by ygupta@adobe.com</title>
      <link>acrobat:Review?reviewID=9a3248f2866cf54fae022feef517471e</link>
      <ttl>120</ttl>
      <description>These are comments made by ygupta@adobe.com for the review
      <lastBuildDate>Thu, 25 Oct 2007 16:08:23 +05:30</lastBuildDate>
      <generator>Acrobat SOAP 8.0</generator>
    - <m:reviewInfo xmlns:m="http://ns.adobe.com/Acrobat/RSS/Reviews/">
        <m:initiator>a@a.aa</m:initiator>
        <m:reviewID>9a3248f2866cf54fae022feef517471e</m:reviewID>
      - <m:reviewer>
          <m:corporation>Adobe</m:corporation>
          <m:deadline>D:20071025160823</m:deadline>
          <m:displayName>Yash Gupta</m:displayName>
          <m:email>ygupta@adobe.com</m:email>
          <m:isAdmin>false</m:isAdmin>
          <m:title>Engineer</m:title>
          <m:password>$#%@</m:password>
        </m:reviewer>
      </m:reviewInfo>
    - <item>
        <visibleTo>ygupta@adobe.com;dikumar@adobe.com</visibleTo>
        <title>Text Annotation by Yash Gupta (ygupta@adobe.com)</title>
        <guid>0-224c9cb6-c87a-4626-a410-e0535ea5c6c3</guid>           ← 314
        <author>Yash Gupta (ygupta@adobe.com)</author>
        <publishingTime>D:20080714113343</publishingTime>             ← 316
        <description><?xml version="1.0"?><body xmlns="http://www.w3.org/1999
          ><p dir="ltr"><span dir="ltr" style="font-size:10.0pt;text-align:left;color:
      - <m:text color="#ffff00" creationdate="D:20071025160811" date="D:2007102510
          page="0" rect="305.683167,500.352661,325.683167,518.352661" reftype="R
          <m:popup open="yes" rect="498.614014,398.352661,678.614014,518.35266
        </m:text>
      </item>
    - <item>
        <visibleTo>ygupta@adobe.com;dikumar@adobe.com</visibleTo>
        <title>Text Annotation by Yash Gupta (ygupta@adobe.com)</title>
        <guid>0-224c9cb6-c87a-4626-a410-e0535ea5c6c3</guid>           ← 324
        <author>Yash Gupta (ygupta@adobe.com)</author>
        <publishingTime>D:20080715123023</publishingTime>             ← 326
        <description><?xml version="1.0"?><body xmlns="http://www.w3.org/1999
          ><p dir="ltr"><span dir="ltr" style="font-size:10.0pt;text-align:left;color:
      - <m:text color="#ffff00" creationdate="D:20071025160811" date="D:2007102620
          page="1" rect="305.683167,500.352661,325.683167,518.352661" reftype="R
          <m:popup open="yes" rect="498.614014,398.352661,678.614014,518.35266
        </m:text>
      </item>
```

FIG. 3

COLLABORATIVE REVIEW APPARATUS, SYSTEMS, AND METHODS

BACKGROUND

Collaborative review processes are enhanced by the presence of communication networks to bring a wide variety of participants together to accomplish common goals. For example, many documents generated in today's electronic society are created by an individual, but subject to review by several others. These documents to be reviewed are thus commonly created as a form of electronic content that is forwarded to others for review and revision, perhaps using an electronic network.

Reviewers participating in this shared review process typically make markups and comments, and sometimes changes, to an individualized version of the document, with each version having its own comments, markups, and other annotations. A set of modified documents may then be sent back to the document creator. The document creator then has the task of sorting through each of possibly many document copies and consolidating the comments (and changes) into a single edited copy. Some comments and changes may be the same across the versions, but the creator of the document still needs to sort through all of the information to make such a determination.

Some reviewers come to the review process late, so they are not aware of how the document has evolved, particularly with respect to comments made by other reviewers. Even if they have a desire to do so, they are often unable to see which form of a particular comment was in place at a particular time, because no such history is retained. Thus, late reviewers may end up duplicating comments and changes that have already been processed by other participants.

BRIEF DESCRIPTION OF THE DRAWINGS

Some embodiments are illustrated by way of example, and not limitation, in the figures of the accompanying drawings, in which:

FIG. 3 illustrates the content of a comment revision history information file according to various embodiments.

DETAILED DESCRIPTION

Figure 1:
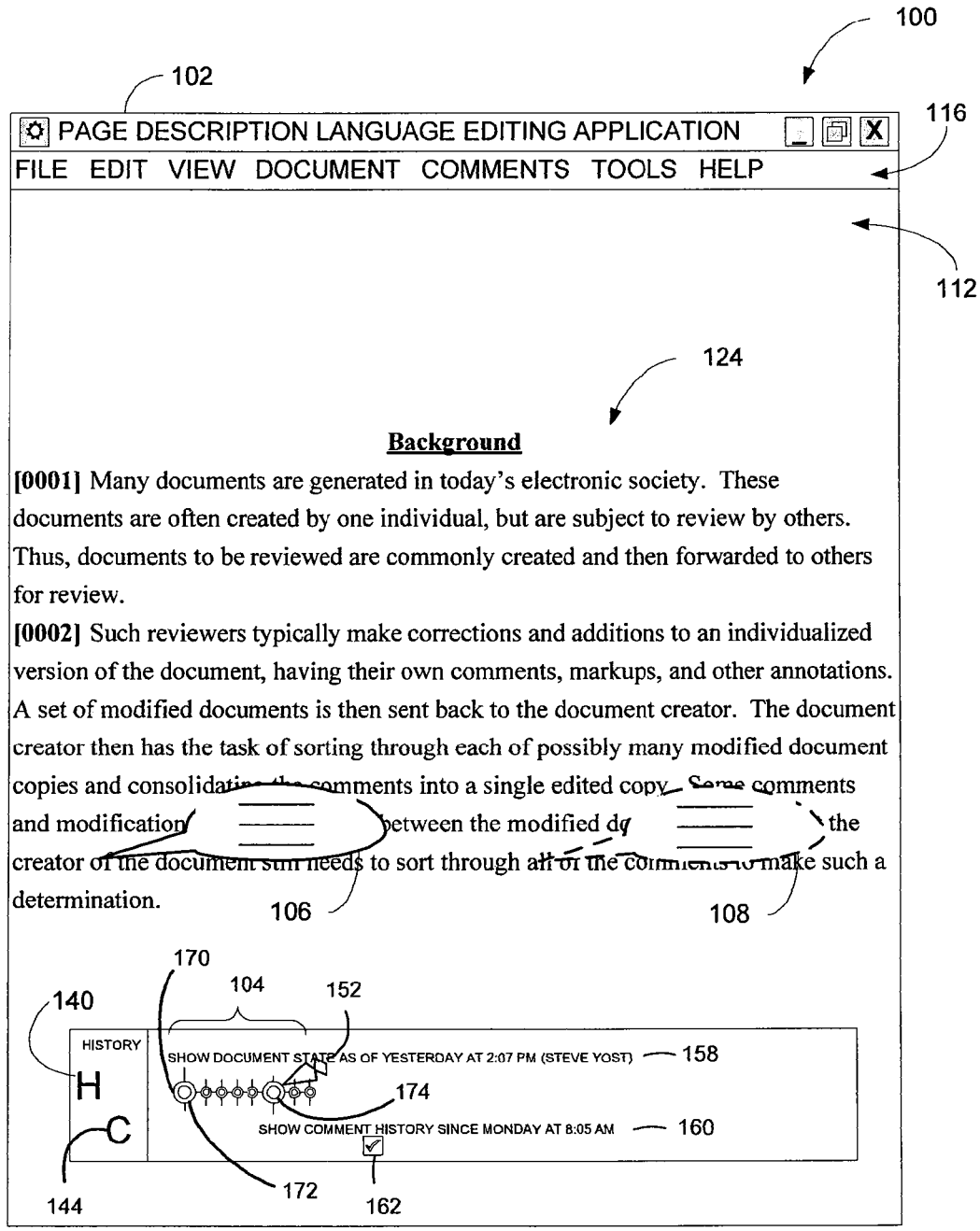
FIG. 1 illustrates the display of document and comment revision history using a time line with tracked changes as part of a graphical user interface (GUI), according to various embodiments.

In the following detailed description, numerous specific details are set forth to provide a thorough understanding of claimed subject matter. However, it will be understood by those of ordinary skill in the art that claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others of ordinary skill in the art. An algorithm is here, and generally, considered to be a self-consistent sequence of operations or similar processing leading to a desired result.

In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, throughout this specification discussions utilizing terms such as "processing," "computing," "calculating," "determining" or the like refer to actions or processes of a computing platform, such as a computer or a similar electronic computing device, that transform data represented as physical electronic or magnetic quantities within memories, registers, other information storage devices, transmission devices, or display devices of the computing platform.

Almost all document processing application programs operate to save the most current version of a document while it is being generated. Some of these applications permit saving prior versions as well, creating an archive of saved documents. As one example of a collaborative workflow, these documents may be edited by a number of reviewers as part of a shared review activity.

Applications like the ADOBE® ACROBAT® electronic publishing program provide shared review functionality, where a document (which the author would like to be reviewed via collaboration with others) is hosted on a device, such as a server. Reviewers can add comments to the document and publish their comments so that the comments can be viewed by other reviewers as well.

Such applications provide commenting and annotating tools (e.g., a Note tool, a Highlight tool, an Underline tool, etc.) to add comments to a document. Once a comment is published, it can be viewed by other reviewers, and they in turn can comment on the published comment, publishing their reply, as well. Thus, it is possible that the original author of any given published comment might like to publish updates to their original comment. However, once a comment has been updated and republished, other participants in the shared review activity can only see the latest version of that comment. This is because the central comment repository only retains the latest properties or values of that comment.

This aspect of the shared review process makes it difficult for other participants, particularly those who are new to the review, to understand how a particular comment, as well as the shared review process, has evolved. Sometimes, this lack of knowledge results in unnecessary iteration and additional comments while the new reviewers slowly come to understand the entire context of the ongoing review. Such duplicative and wasted effort reduces the effectiveness of the shared review collaborative process.

Given this situation, there is no way for each participant in a shared review to audit the progress of the review on a time line, for example. In other words, it is impossible for any of the participants to play back the state of the shared review over time, or to visualize the state of a shared review activity at a particular point of time in the past. For example, an individual reviewer is unable to see how a particular comment has evolved over time.

The inventors have determined that comments provided within a collaborative workflow environment can be more usefully applied when changes to the comments are monitored and recorded, so that a history of the comment changes can be recalled as desired. A time line may be displayed in conjunction with the comment change history, so that selected periods of the shared review development can be viewed and replayed. This mechanism can lead to more efficient review operations, especially in situations when many collaboration participants are involved.

For the purposes of this document, a "collaborative workflow" includes any activity in which multiple machines operate together autonomously, or as directed by humans, to process information, including electronic content. Processing the information may include the activities of acquiring the information, augmenting the information (e.g., via the addition of meta-data, such as comments), sorting the information, changing the information, deleting the information, rendering the information, aggregating the information from multiple sources, transforming the information from one form to another, and deriving new information from previously-existing information. One example of a collaborative workflow is the cooperation of multiple reviewers to view, comment on, and make changes to a document as part of a shared review activity.

The term "electronic content" includes any digital data that may be presented to a reviewer (e.g., visually or audibly presented), such as an electronic document, page-descriptive electronic content such as a page-descriptive electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, or a file format designation) or may be manually defined by a reviewer (e.g., a reviewer-selected collection of words in an electronic document, a reviewer-selected portion of a digital image). Examples of content elements include portions of a page-descriptive document or other electronic document, such as pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

The term "rendering" used as a verb includes presenting or making accessible electronic content or content elements to be perceived, viewed, or otherwise experienced by a reviewer, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a printer or display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a reviewer, including the presentation of content elements such as text, graphics, form element renderings, and other electronic content elements. An example of a rendering module includes a web browser component (e.g., Microsoft Internet Explorer) or other component to render electronic content such as HTML pages. Another example of a rendering module includes the ADOBE® ACROBAT® electronic publishing program.

The term "rendering program" includes applications for rendering or presenting dynamic content to a reviewer. An example of a rendering program is the ADOBE® FLASH® Player 9 runtime software application. In many embodiments, a rendering module interacts with a rendering program to render dynamic content.

A "reviewer" is one who creates, views, reviews, revises, or deletes electronic content, including the creation or updating of comments associated with the electronic content. A reviewer includes a user of application programs, as well as the apparatus and systems described herein.

As an example of a collaborative workflow, it is common for one or more reviewers (or other actors, such as automated processes) to view, review, and revise electronic content as part of a shared review activity. It should be noted that a shared review environment is discussed herein as only one example of a collaborative workflow activity in order to simplify the discussion, in the interest of clarity. Any number of other collaborative workflow activities may also be adapted to use the mechanisms described herein.

When viewing, reviewing, or revising, a reviewer may initiate execution of an application (e.g., a rendering module) to render or otherwise present electronic content. This electronic content may take a variety of forms, such as an electronic document, an audio file, video file, sequence of images, dynamic content, combinations thereof, and other forms of electronic content.

During the course of this activity, the reviewer may be presented with a rendering of various content elements (e.g., using an output device, such as a display) included or otherwise associated with the electronic content. In some embodiments, these content elements, such as comments, may be presented in a sequential order so as to indicate their positions or interrelationships within the electronic content, or for ease of reviewer perception.

Various types of content elements contained within electronic content may be presented to a reviewer on an output device in various ways according to the nature of the content elements and/or the preferences of reviewers. For example, electronic content representing an electronic document may be presented on a display screen in the form of renderings of pages as they might appear if the electronic document were to be printed out.

In some such embodiments, the reviewer may use a mouse, keyboard, touch pad, voice input, and other input devices to explore the electronic document. An application associated with reviewing activity may provide such affordances as scroll bars, fast forward/reverse scan buttons, and other GUI elements to be manipulated by the reviewer to carry out exploration of the electronic document. This exploration may be used when the entire electronic document is too large to conveniently display on a computer screen at one time.

While reviewing or revising electronic content that includes content elements, the reviewer may wish to record or otherwise keep track of a particular state of revision. One way of tracking this state is by saving a version of the electronic content, and adding it to the content archive history. As part of the document history, comments may be added, deleted, or changed (collectively, "updated") by various reviewers. Monitoring, recording, and display/replay of revisions to comments over time, as part of the archive history, is addressed by the various mechanisms described herein.

It should be noted that there are at least two different types of shared review processes that can benefit from using the various embodiments presented herein. In the first, the original document remains unchanged—only comments and markups are added, deleted, and changed by the reviewers. In the second, the content of the original document, as well as comments and markups, can be added, deleted, and changed by the reviewers. While the second, more complex type of review is detailed in the following discussion and shown in the figures, the reader should keep in mind that the first type of review can also be implemented.

For example, as part of the development cycle for creating a finished document, the document creator or someone else might initiate a shared review activity by inviting a number of other people to review the document. All of the reviewers can then collaborate using commenting and markup tools to add comments to the document. Participants can add their comments and then publish them as part of the process.

The comments can be converted to any desired format, such as XML, and then uploaded to collaboration comment repository. Each reviewer can then synchronize the instance of the document they see with the state of the repository, and are thus able to see comments published by other reviewers.

The invitations to review may be transmitted to a group of reviewers in parallel, serially, or in some other fashion. Thus, it sometimes happens that some reviewers are invited to participate later than others. Even when all participants are invited at the same time, they usually do not join in the review activity until it is convenient for them to do so.

In conventional workflow management systems, late-joining reviewers that hope to see the workflow comment history over time will not be able to do so, because once a comment has been updated, the prior content of the comment is lost. This occurs due to the prior content being replaced in the repository by the updated content. Thus, only the current (latest) state of shared review commentary is accessible to reviewers at any given point of time. There is no provision to go back and discover the path that was used by the individual reviewers, or the group as a whole, to reach the current state.

To solve this problem, in some embodiments, the comments published by each reviewer are saved in a file, such as an XML file, at the server that houses the collaboration comment repository. Each reviewer has an individual comment file, and all comments published by that reviewer can be placed in the reviewer's file. Each published comment is uniquely identified by the value of an identifier, such as a global unique identifier (GUID). The comment may include an author tag to identify the author that published the comment.

All versions of each comment are stored in the collaboration comment repository. Thus, updates to each comment are saved to the same file as they are published. Earlier versions of comments are not overwritten, and continue to exist in their own right. In this way, all versions of a particular comment can be stored in conjunction with a single identifier that is unique to that comment, such as a GUID. Some of the possible changes to a comment include, but are not limited to, the text/content of the comment, the style of display for the comment, the font and presentation of the comment, the placement of the comment in the document, the status of the comment, etc.

Since each comment in a file can have an associated timestamp, perhaps identified by the "publishingTime" variable in some embodiments (e.g., recording the time the comment was published), each version of a comment can be uniquely identified by the value of this variable and the associated GUID. By rendering comments in sequence via the "publishingTime" variable values, for each comment over all document versions, a group of reviewers can view the evolution of shared review document development activity over time. Of course, if the shared review process does not permit changing the document content, then the variable values can be accumulated over a single version of the document, and the evolution of comments within that version may still be viewed.

For example, as reviewers synchronize the repository storage content with their working instance of a particular document, all versions of the comment can be obtained, and the latest version of each comment can be shown to participating reviewers. However, since additional information is available from the collaboration comment repository, reviewers can also browse through the comment history to determine changes over the lifetime of each comment. This aspect may be of great value to those reviewers that are invited to participate later on in the review process.

It is quite common that all the invited reviewers do not join a particular shared review process at the same point in time. Thus, except for the cost of real-time knowledge acquisition, there is no disadvantage to joining a shared review later in time, versus earlier. In addition, these mechanisms enable all reviewers, no matter when they join the process, to refresh their memory by viewing comment changes along a time line—simply by arranging all versions of all comments from all reviewers in increasing order of their "publishingTime" variable values, and perhaps playing this back as a movie to any particular reviewer. This information also permits reviewers to visualize the state of the shared review at any point of time in the past.

FIG. 1 illustrates the display of document and comment revision history 100 using a time line 104 with tracked changes as part of a GUI 102, according to various embodiments. The GUI 102 shows an example of a viewport 112, such as a window, that may be displayed by a reviewing application to present renderings of electronic content in the form of an electronic document 124 that includes one or more pages of information.

The GUI 102 is an example computer application user interface within which a reviewer may view a document 124 submitted for review. In some embodiments, the GUI 102 is provided by a page description language reviewing application, such as one of the ACROBAT® or ACROBAT® READER applications available from ADOBE SYSTEMS, INC. of San Jose, Calif. The page description language, in some embodiments, comprises the PORTABLE DOCUMENT FORMAT ("PDF"), also available from ADOBE SYSTEMS, INC.

The GUI 102 may include menu items 116 and a document presentation area within the viewport 112. The viewport 112 permits a reviewer to see some or all of the document 124; typically, only a portion is shown. A reviewer may use controls forming part of the GUI 102 to add a comment 106 or otherwise mark up a document 124, or other content item, displayed in the viewport 112. The application may also operate to retrieve comments 106 stored on a collaboration server, by workflow services, or from another location or service as may be identified within a document displayed within the viewport 112. A collaboration server, or other location from which comments are retrieved, may be specified as an application configuration setting, entered by a reviewer, or specified within the document 124 itself, perhaps using document metadata. The metadata may also identify a specific collaboration session of the document 124.

In some embodiments, a collaboration server may hold multiple versions of a particular comment, such as an earlier version 106 of the comment, and a later version 108 of the comment (which is shown here in outline form to indicate the earlier version 106 of the comment has been deleted). Each of the versions 106, 108 are stored and can be retrieved at will. This is so, even though the latest version 108 of the comment has been deleted. Thus, a reviewer invited to review the document 124 will be able to discover that the earlier version of the comment 106 is now deleted. Even so, the content of the earlier version 106 can be read and therefore, the reviewer will know the history of the collaboration concerning this particular comment as it existed between selected versions 172, 174 of the document 124.

In some embodiments, comments 106, 108 can be stored in a manner that prevents specified reviewers from viewing their history. Thus, comment 108 may be stored in a manner that prevents one reviewer from viewing the comment 108. Another reviewer may be able to view the comment 108 and not the comment 106. Yet other reviewers may or may not be able to view both comments 106 and 108.

In many embodiments, a reviewer that uses a document processing application constructed to operate according to the principles disclosed herein can access various versions of the document 124 (with the exception of the working version) by clicking on a history icon 140. The history icon 140, as well as the time line 104, may form a part of the GUI 102 display associated with a document processing program, and can be located anywhere in the GUI 102, as desired. For example, the history icon 140 and time line 104 can be located in the lower left or lower right corner of a display screen.

In some embodiments, the timeline 104 may change, or a separate timeline may become visible with respect to individual comments 106, 108 when the reviewer operates a mouse to hover the cursor 152 over the selected comment. In some embodiments, when the content of the document 124 can not be changed by reviewers, the timeline 104 may be used solely to refer to the revision history of selected comments. For example, by clicking on a selected comment 106, the timeline 104 may then change to reflect the version history of comment 106, instead of another comment 108 that was previously selected by the reviewer. Other forms of reviewer interaction are possible.

Executing the command represented by the icon 140 has the effect of presenting a time line 104 that includes all of the document versions, from the most recent (on the left-hand side of the time line 104) to the earliest (on the right-hand side of the time line 104), to the reviewer. In some cases, the current version 170 is shown as being selected at the far left of the time line 104, and as a mouse or other user-controlled pointing device is moved to hover a pointer 152 over each indicated version on the time line 104, a message 158 is displayed to show the identity of the person that created that version, and the time at which it was created (e.g., when it was saved). If the pointing device is "clicked" or otherwise actuated to indicate a selection, the particular version of the document selected (here, the version 172 that is the same as the most current version 170) is presented for viewing.

It should be noted that adding a comment 106 to a document 124 does not necessarily operate to generate a new version of the document 124 when the document 124 is saved. Separate versions of a document 124 may arise upon saving the document 124 when changes to the text or other content of the document 124 are made, but this occurrence is not part of all shared review processes. Thus, in many cases, even though several reviewers may have added comments 106 to a document 124, there may be only one version of that particular document 124, because no content in the document is changed.

As a document 124 is edited, various versions can be saved locally, or on a server. Each version can provide a snapshot of the entire document 124, including changes and merged comments from reviewers. Saving the document 124 can be triggered in many ways, including receiving an explicit "save" command from a reviewer, or by an application program auto-save mechanism which is not directly controlled by the reviewer.

Each time a document's contents 124 are saved (e.g., explicitly or via auto-save), they can be saved as a new version, rather than overwriting the previous version. Versions may be maintained in the archive history along with the date-time when they were saved (created), and the identity of the reviewer who saved them.

In the example GUI 108, the ability to select a first (e.g., more recent) version 172 and a second (e.g., older) version 174 of the document 124 is provided. Information 158 describing the time, date, and author of the first version 172 is shown above the time line 104, while the information 160 describing the time, date, and author of the second version 174 is shown below the time line 104. However, various embodiments are not to be so limited.

A "Show Changes" checkbox 162 may be displayed in conjunction with the second version 160 (which may be displayed directly above the checkbox 162, so that the checkbox 162 is positioned beneath the second version 174 even when unchecked). A default second version 174 may be chosen as the version that was last viewed by the current reviewer, if desired.

The difference display, which is a display of changes between the two selected versions 172, 174 of the document 124, including comments, can selectively be turned on or off by checking the checkbox 162, or otherwise indicating such a selection. In addition, the versions to be used for a difference display can be selected, and when the difference display is active, there is the ability to jump from one change to the next throughout the document 124. If the shared review process type is such that reviewers are not permitted to change the content of the document 124, then the difference display may operate to display only changes to comments and markups.

Both the upper and lower tracks of the history bar 100 can be live for setting the first (e.g., current) version 172 and the second (e.g., prior) version 174 of the document 124. Using a mouse over operation, the version highlight and label can be made to change to show the version that will be selected for viewing if the mouse is clicked. The reader should note that the second version track normally does not exist directly beneath or to left of the first version track, since designers of many embodiments may decide that prior versions cannot be selected as a "more recent version" than the first version. Here it can be seen that the comment history includes only versions 106, 108 of the comments in existence between the time the first document version 172 was created, and the time that the second version 174 was created, five versions prior to the most recent version 170.

Figure 2:
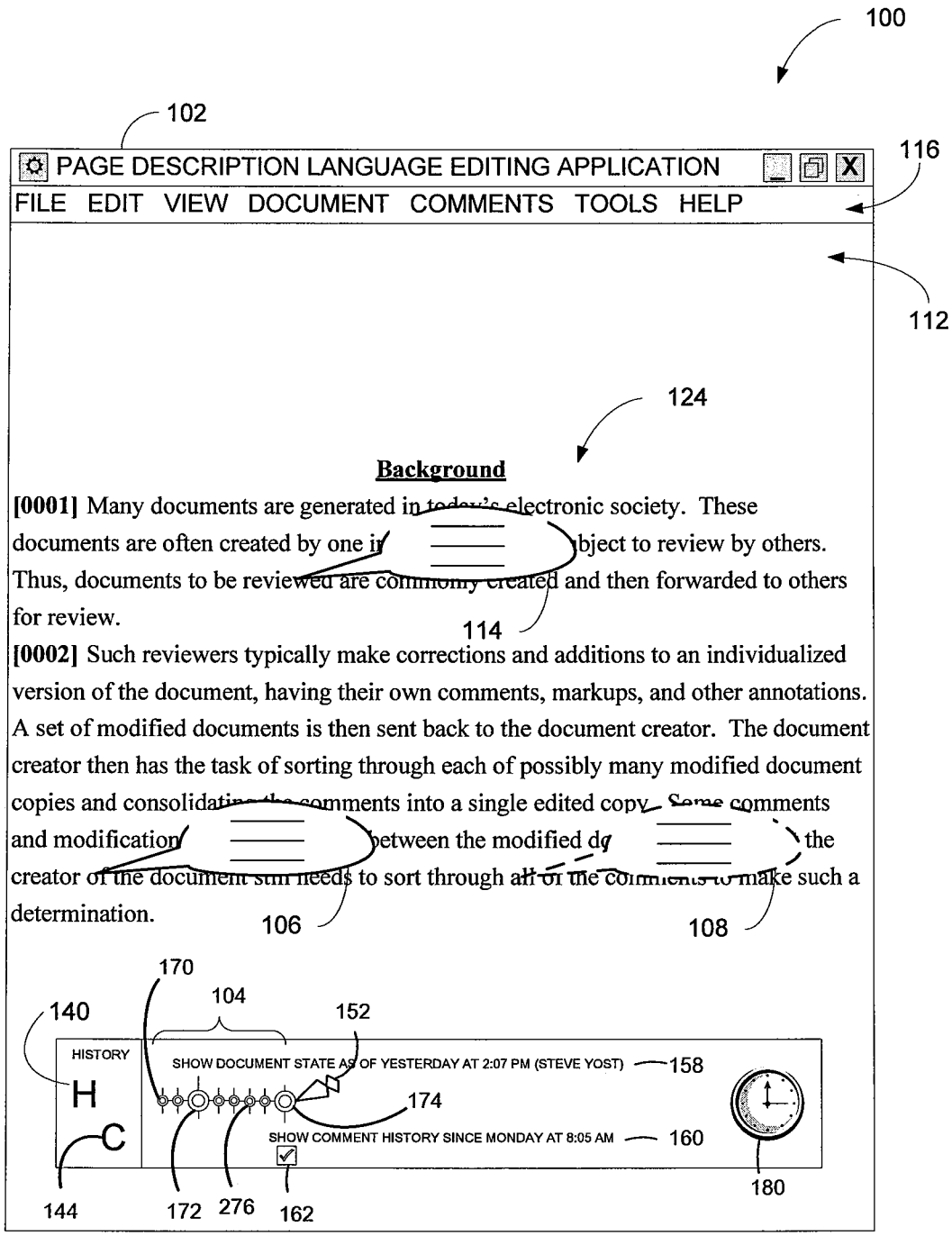
FIG. 2 illustrates the display of document and comment revision history using a time line along with additional tracked changes as part of a GUI, according to various embodiments.

FIG. 2 illustrates the display of document and comment revision history 100 using a time line 104 along with additional tracked changes as part of a GUI 102, according to various embodiments. As was the case in FIG. 1, versions along the time line 104 can be indicated using version indicators: some version indicators comprise a dot version indicator 276, indicating one of several versions on the time line 104; other versions indicators comprise circle version indicators (e.g., indicators associated with the first and second document versions 172, 174), to indicate a version on the time line 104 that has been selected by the system and/or a reviewer. Other graphic figures can be used as version indicators.

In a manner similar to that used to display the history of document versions, including the comment history, comment history alone can also be selected. That is, the comment history can be displayed independently of the document version history.

This can be accomplished by executing the command represented by the comment history icon 144, which has the effect of deactivating the operation of the document history icon 140 (effectively freezing the difference display of the document 124), and presenting the time line 104 that now operates to select versions of a comment, from the most recent version 108, to the earliest 114, for presentation to the reviewer. A mouse or other user-controlled pointing device can be moved to hover a pointer 152 over each indicated document version on the time line 104, and information 158, 160 is displayed to show the time the referenced versions were created (e.g., when they were saved). If the pointing device is "clicked" or otherwise actuated to indicate a selection, the particular version of the documents selected (here, the versions 172, 174 that are two and seven versions, respectively, older than the most current version 170) are indicated via the information 158, 160.

In this case the comments 106, 108, 114 that make up the version history of a particular comment between the creation time of the two selected document versions 172, 174 are presented for viewing, irrespective of the state of the difference display of the document 124 put into effect by the activated document history icon 140. When the icon 144 (for comments) has been activated, the display of the history of changes between comments can be turned on and off by selecting or deselecting the checkbox 162. As noted previously, in some embodiments, the history of individual comments 106, 108 may also be selected, perhaps by "right-clicking" a mouse button to select a particular comment after the icon 144 has been selected, which in turn results in changing the timeline 104 to reflect the history of only that comment.

In some embodiments, the selection indicators associated with the document versions 172, 174 may each be dynamically-selectable, with the newer version and the older version on opposite sides of the time line. "Dynamically selectable" means that cursor movement in the proximity of one of the version indicators is sufficient to initiate information display activity with respect to that particular version indicator. For example, a lead line may follow the cursor 152 from version to version, as the cursor 152 hovers over various versions. Similarly, information identifying a user/save time may follow the cursor 152, and the information may change dynamically with respect to the associated version as the cursor 152 moves from version to version. "Cursor movement" occurs when the cursor 152 moves from one location in space (along at least one dimension) with respect to the current display, to another location in space with respect to the current display, and is not substantially stationary.

If desired, the comment change history can be played back in movie fashion by selecting the playback icon 180. Thus, if the icon 180 is selected, comments 114, 106, and 108 can be played back over a specified period of time (e.g., each comment is displayed for fifteen seconds before fading out to make way for the display of the next version in time, as denoted on the icon 180), or as indicated in real time by the reviewer, so that each time a user input device is activated (e.g., a mouse click), the next newer version of a selected comment is displayed. The comment display time period may be specified by the reviewer (e.g., by adjusting the time shown on the icon 180), and the direction in time in which playback occurs (e.g., forward or reverse) may also be specified.

FIG. 3 illustrates the content of a comment revision history information file 300 according to various embodiments. When a reviewer publishes a comment as part of shared review activity, its properties can be converted to XML and published to a location or a file 300 stored in a collaboration comment repository. This file 300 may be unique for each participant in a shared review exercise. Each comment 310, 320 is uniquely identified by a GUID 314, 324 in the XML file. It should be noted that while an XML file including Really Simple Syndication (RSS) information is used to illustrate the principles outlined herein, the various embodiments are not to be so limited. Any file format or language may be used, as long as comment series identifiers (here given as a GUID) and comment differentiation identifiers (here given as the <publishingTime> variable, which permits identifying comment versions in chronological order) are available to distinguish one version of a comment from another.

Thus, the first time a comment 310 is published by a reviewer, it is converted to XML and stored in the file 300.

If the comment 310 is updated and republished, its properties will again be converted to XML and stored in the file 300. However, instead of updating the earlier version of this comment 310, the newer version of the comment 320 will be posted under the same comment series identifier (e.g., the same GUID) with a different comment differentiation identifier (e.g., a different value for the <publishingTime>).

Different embodiments may store the historical information about the comments 310, 320 in different ways, providing increased flexibility. For example, instead of publishing all the properties of the earlier comment 310 with respect to the later comment 320, only those properties of the comment 310 which have been modified since the prior publication might be published as part of the record associated with the updated comment 320. In that case, only the properties that have changed (e.g., the publication time, description, and date) are stored in the collaboration comment repository.

As reviewers join the shared review activity, they can synchronize their document reviewing applications to the information contained in the file 300, and thus receive all versions of all comments that have been published to-date by all participants as part of the shared review activity.

Files 300 may be maintained in a variety of ways. For example, consider an implementation which keeps a file 300 for each reviewer's comments on a server that holds the collaboration comment repository. An <item> tag may be used to contain the RSS information of a particular version of a comment that is published as part of a shared review exercise, as shown in FIG. 3.

For example, with respect to comment 310, the first version of this particular comment, the reviewer/author ygupta@adobe.com has published a text annotation as a comment 310 in a shared-review and its GUID of 0-224c9cb6-c87a-4626-a410-e0535ea5c6c3 is used to identify the comment series associated with the history of this particular comment.

When this same user updates the comment 310 to be republished as updated comment 320, the associated information will again be converted to RSS and published to the file 300. However this time instead of overwriting the existing entry under the same <item> tag and GUID, another <item> tag with the same GUID and a new <publishingTime> is made part of the RSS associated with the series of comments 310, 320 in the history.

Thus there are now two versions 310, 320 of the same comment in the file 300. The series associated with this comment is identified by the GUID 0-224c9cb6-c87a-4626-a410-e0535ea5c6c3, and each version 310, 320 is further identified by the value of a differentiation identifier variable <publishingTime>. If another review synchronizes their reviewing application to the file 300, the entire RSS will be downloaded so that the instance of the document viewed by that reviewer will include both versions 310, 320 of the comment, whether their invitation to participate in the shared review was offered before or after the comment 310 was updated.

In some embodiments, the latest versions of all comments published by a single reviewer can be kept in one file (not shown), while all versions of all comments are kept in another file, such as file 300. In this implementation, each reviewer might then be associated with two files in the collaboration comment repository: a "latest versions" comments file, and an "all versions" comments file. The advantage to this mechanism for managing comment history information is that reviewers interested only in viewing the latest versions of comments can specify this to be the case in their shared review application settings, so that a smaller file will be downloaded to them at synchronization time. At any time, of course, a reviewer may opt to receive the file 300 that has all versions of all comments. Thus, many embodiments may be realized.

Figure 4:
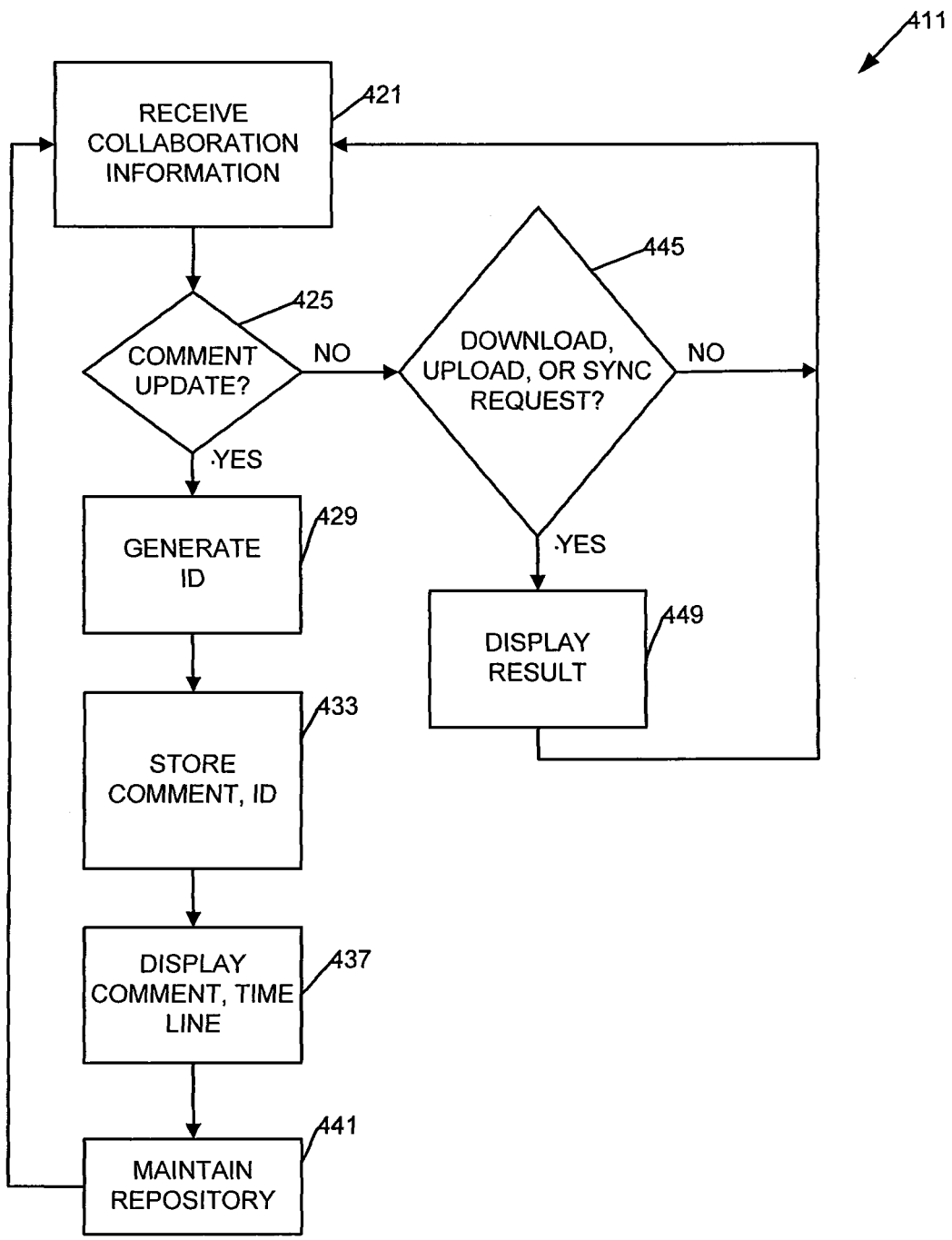
FIG. 4 is a flow diagram illustrating several methods according to various embodiments.

For example, FIG. 4 is a flow diagram illustrating several methods 411 according to various embodiments. Thus, a method 411 of managing comments as part of a collaborative workflow may begin at block 421 with receiving information associated with the collaborative workflow. The information may comprise a request to publish a new comment, a request to publish an update to a comment, a request to synchronize comments, a request to download or upload a comment history, or any number of other types of information. The information may be transmitted by a server, a client, a user input device, or some other machine.

The method 411 may continue on to block 425 with determining whether a request to publish an updated comment has been received. If not, then the method 411 may continue on to block 445.

If a request to publish an updated comment associated with an original comment by a comment series identifier has been received, as determined at block 425, then the method 411 may continue on to block 429 with generating a comment differentiation identifier to differentiate the updated comment from the original comment.

As noted previously, the comment series identifier may comprise a GUID, which is common to all comment versions in a series, such as the original comment and its updated version. The comment differentiation identifier may comprise a time stamp, or any other stable value that can be used to differentiate between associated comment versions within a comment series. Thus, in some embodiments, the comment differentiation identifier may be formed as a combination of a GUID and a time stamp, such as a hashed value of the two components, for example. The method 411 may continue on to block 433 to include storing at least a portion of the updated comment and the comment differentiation identifier in a collaboration comment repository.

In some embodiments, the method 411 may go on to include, at block 437, displaying a time line history of comments, including at least one of the original comment or the updated comment, as part of a collaboration workflow comprising comments from a set of reviewers. The time line display of comment history may comprise the history of a single comment, the history of a single reviewer's comments, or the history of the comments of any number of reviewers, on up to the complete set of reviewers involved in a collaboration workflow.

The activity at block 437 may comprise displaying a time line history of selectable comment versions in conjunction with displaying an updated version of a comment. That is, the time line history may provide the ability to selectively display prior versions of an updated comment, as shown in FIGS. 1 and 2.

The method 411 may go on to include, at block 441, maintaining all versions of one comment (e.g., the original comment and the updated comment), in the collaboration comment repository. This activity may extend to include maintaining all versions of all comments associated with a document in the collaboration comment repository. Other variations of how comment history is maintained in the repository at block 441 includes maintaining the collaboration comment repository as a set of files corresponding to a set of users cooperating in a shared review of a document, all versions of all comments from each one of the set of users being segregated by user.

In some embodiments, the activity at block 441 includes maintaining the set of files as a set of current comment version files and complete comment version files for each one of the set of users, as described previously. Indeed, segregated user files may be further separated into files of only current versions of comments, and files containing all versions of the comments. Any portion or all of the collaboration comment repository may be maintained as a set of XML files. The method 411 may continue on from this point to receiving further information at block 421.

If an updated comment was not received, as determined at block 425, the method 411 may continue on to block 445 to determine whether a request to synchronize, download, or upload comment history has been received. If not, the method 411 may continue on to block 421 to receive further information.

If a request to synchronize, download, or upload some or all versions of some or all comments associated with a document is received, as determined at block 445, then the method 411 may continue on to block 449. Thus, the method 411 may include receiving a download request to obtain only the most recent version of comments, or all versions of the comments, for example. In some embodiments, the method 411 may include receiving a synchronization request for one or more comments, or an upload request to upload comment history for some or all comments.

At block 449, the method 411 may include displaying a collaboration workflow state as a selected group of comments derived from all existing versions of all comments associated with a document. The display may be transmitted to and made at a reviewer's terminal. The selected group may comprise a group of comment versions in existence at a selected past time. Thus, a group of comment versions can be selected based on a designated time period, perhaps defined by versions of a document.

The activity of displaying at block 449 may include displaying collaboration workflow progress as a series of collaboration workflow states associated with a document, wherein each of the collaboration workflow states comprises a group of comment versions in existence at a corresponding time, and wherein the corresponding time runs in succession from an earlier time to a later time. This describes the playback of comment change history, where multiple groups of comment versions (e.g., multiple series of comments) can be selected for display, based on a defined period of time.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

It should also be noted that in every case where the activity of displaying or rendering is denoted, information may be communicated (e.g., transmitted and received) between a variety of entities to enable such display or rendering activity. For example, a server may transmit information to a receiving entity, such as one or more clients or workstations, to enable displaying or rendering the various visual elements described.

Figure 5:
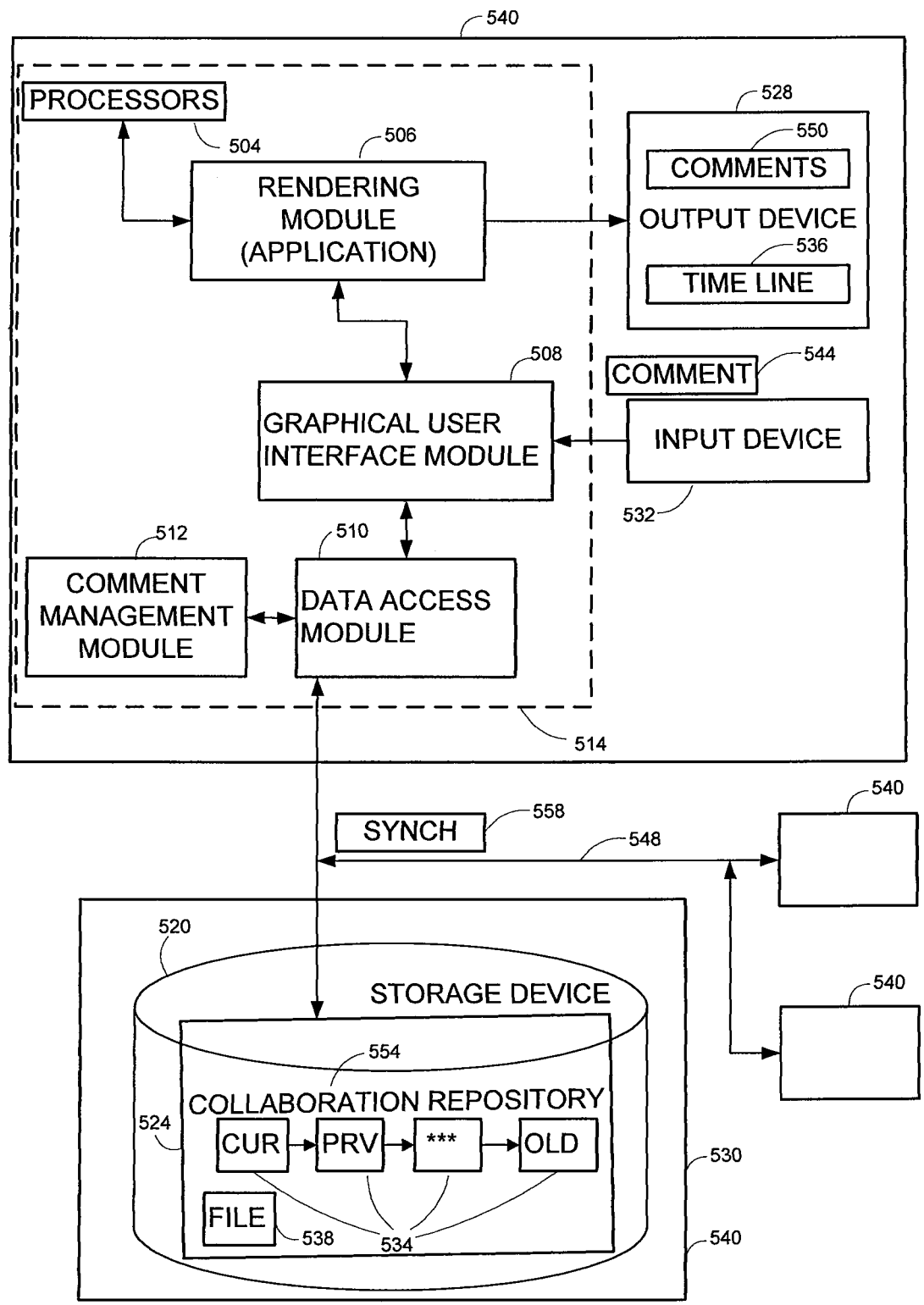
FIG. 5 is a block diagram of apparatus and systems according to various embodiments.

FIG. 5 is a block diagram of apparatus 540 and systems 500 according to various embodiments. The system 500 may include a number of modules such as one or more processors 504, a rendering module 506, a GUI module 508, a data access module 510, and a comment management module 512. The rendering module 506 and the GUI module 508 may take the form of an integral module, or exist as separate modules, as shown. These modules may be associated within a machine 514, such as an apparatus that comprises a PDA, a laptop computer, a personal computer, a workstation, or a server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 and the comment management module 512 to access a storage device 520, such as a database, a memory, a disk, or other storage device. The storage device 520 may serve to contain one or more items of electronic content 524. The data access module 510 may operate to read from and/or write to the electronic content 524 and may provide reading and writing services for the benefit of other system modules, including the GUI 508, the processor 504, the rendering module 506, and the comment management module 512. The electronic content 524 may include one or more content elements 534, such as various versions of a document, including the current version CUR, the previous version PRV, and the oldest version OLD. Thus, the electronic content may be maintained as part of a collaboration repository 554, including a collaboration document repository and/or a collaboration comment repository, to include content elements 534, and comment history files 538, which may be similar to or identical to one or more of the files 300 of FIG. 3. The collaboration repository 554 may be linked to other collaboration repositories collaboration document repositories, and/or a collaboration comment repositories.

The electronic content 524 may comprise a document, such as a word processing document, text, drawings, a data file, a spreadsheet, audio recordings, video recordings, multimedia presentations, comment history files 538, and other types of content. Documents may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006. Many other embodiments may be realized.

The data access module 510 may be present in some embodiments, and absent in others. When present, the data access module 510 may operate as a mediator between the various components of the system 500 and the electronic content 524. For example, the storage device 520 may be included in a remote server 530. The storage device 520 may also form part of an apparatus 540.

The rendering module 506 may be operably coupled to an output device 528, such as a display screen, printer, or loudspeaker, among others. This output device 528 may be used for presenting renderings of content elements 534 and comment history files 538. Rendering may take the form of displaying the content elements 534, history files 538, information derived from the history files 538, a time line 536, indications of selected content elements 534, and changes between the elements 534, as shown in FIGS. 1-2.

A GUI module 508 may be operably connected to the rendering module 506 and the data access module 510. The rendering module 506 may comprise a portable document format processing program in some embodiments.

The GUI module 508 may receive input from input devices 532 (e.g., a keyboard, a mouse, a trackball, voice recognizer, touch pad, touch screen, etc.), including user input comprising a "File, Save" command to publish a comment 544 as part of the electronic content 524 in response to the prompting of a GUI presented by an electronic content reviewing application. Thus, many embodiments may be realized.

For example, a machine 514 may form part of an apparatus 540 to manage comments as part of a collaborative workflow, the apparatus comprising an output device 528, such as a display. The apparatus 540 may further comprise a comment management module 512 to receive an updated comment 544 associated with an original comment by a comment series identifier, to generate a comment differentiation identifier to differentiate between the updated comment from the original comment, and to store at least a portion of the updated comment and the comment differentiation identifier as part of the comment history files 538 in a collaboration comment repository. In some embodiments, the comment management module 512 may be used to maintain reviewer preferences comprising a selection between downloading only current comment versions or downloading all comment versions.

All comment properties, changed comment properties, and other properties may be published to the collaboration comment repository. Thus, the portion of an updated comment that is stored may comprise at least some properties of the updated comment, including changed properties of the original comment.

The apparatus 540 may also comprise a rendering module 506 to cause the display to display at least one of the updated comment or the original comment as comments 550. A page description language document presentation application may include the rendering module 506. In some embodiment, the apparatus 540 may further comprise a user input device 532 to select display of the updated comment or the original comment from a time line. The apparatus 540 may also comprise a storage element 520 to store the collaboration comment repository. Still further embodiments may be realized.

For example, a system 500 to manage comments as part of a collaborative workflow may comprise one or more of the machines 514, perhaps as part of an apparatus 540. As noted previously, the apparatus 540 may comprise a server device or a client device. Thus, a system 500 may comprise a server device 540, and one or more client devices (in the form of apparatus 540) communicatively coupled to the server device 540. The system 500 may also comprise a storage element 520, perhaps as part of one of the apparatus 540, or as part of a server device 530. One or more of the client devices 540 or the server devices 530, 540 may comprise an output device 528, such as a display, as well as any part of the machine 514 or storage device 520.

The system 500 may further include a network 548 to transmit an indication 558 to the comment management 512 module to synchronize or publish all comments in the collaboration comment repository. Indications 558 to synchronize or publish comments may come from a variety of sources, such as when a reviewer at a client terminal opens a document associated with a collaboration comment repository, or when the reviewer makes a specific request for comment synchronization and/or publication.

Figure 6:
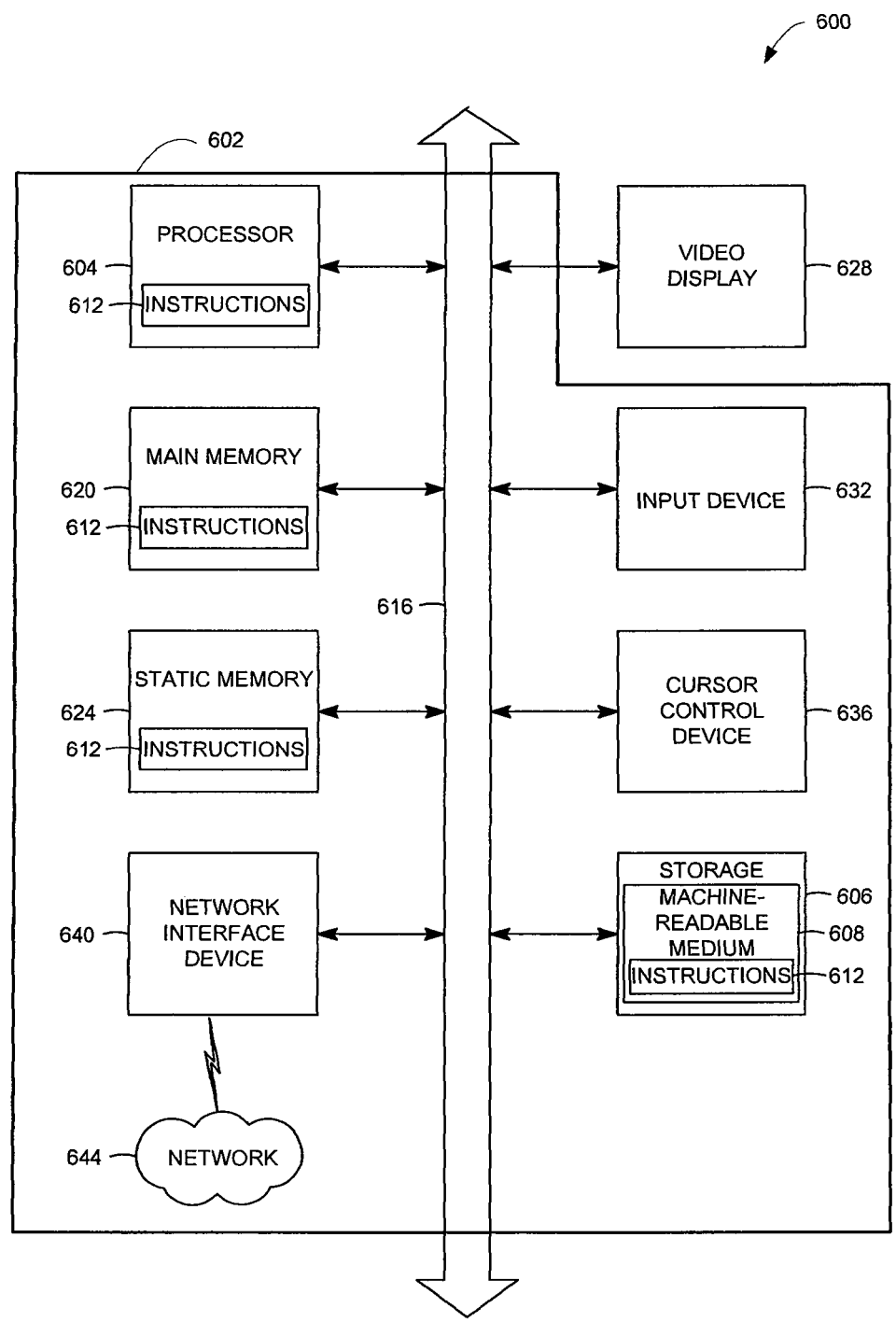
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

The machine 602 may take the form of a computer system having a processor 604 coupled to a number of components directly, and/or using a bus 616. Thus, the machine 602 may be similar to or identical to the system 500, the machine 514, or the apparatus 540 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., the Hyper-Text Transfer Protocol). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. For example, some embodiments may comprise a machine-readable medium having instructions stored therein for causing a machine to implement a method that comprises any of the activities described and shown with respect to FIG. 4.

In some embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Thus, many other embodiments may be realized. For example, a computer-implemented method may comprise the activities of executing instructions on a specific apparatus so that binary digital electronic signals representing an updated comment are received, wherein the updated comment is associated with an original comment by a comment series identifier; executing instructions on the specific apparatus so that binary digital electronic signals representing a comment differentiation identifier are generated, wherein the comment differentiation identifier is operable to differentiate the updated comment from the original comment; executing instructions on the specific apparatus so that binary digital electronic signals are stored in a collaboration comment repository, wherein the binary digital electronic signals represent at least a portion of the updated comment and the comment differentiation identifier; and communicating the at least a portion of the updated comment and the original comment to a display apparatus.

FIGS. 7-10 illustrate several additional embodiments in which the apparatus, systems, and method described herein may be realized. In each case, the GUIs, apparatus, and systems of FIGS. 1-2 and 5-6 may be substituted for similar or identical user interfaces, apparatus, and systems shown in FIGS. 7-10. Similarly, the activities of the methods 411 in FIG. 4 may be substituted for or added to the operations of the methods described with respect to and shown in FIGS. 7-10.

Figure 7:
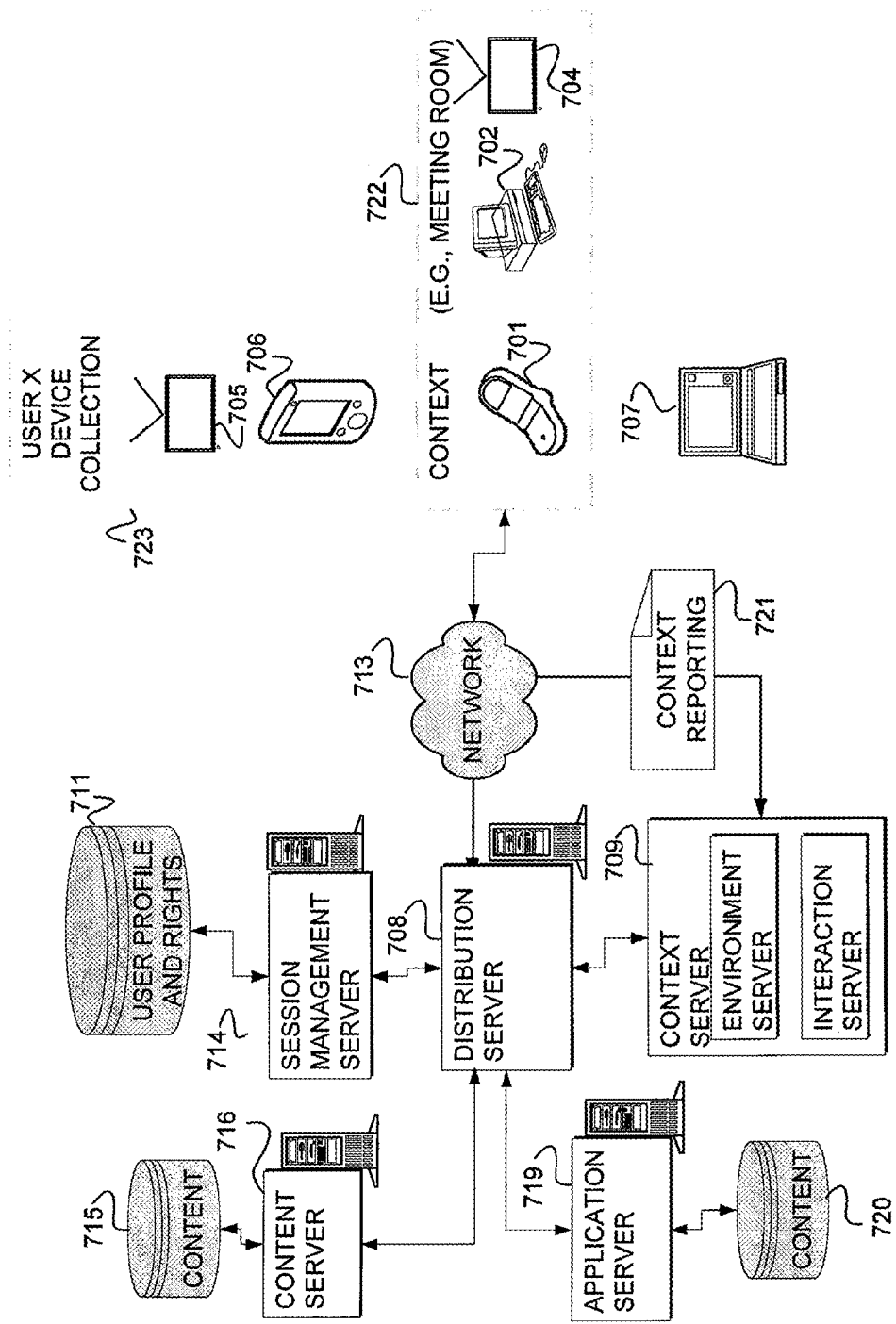
FIG. 7 is a diagram of an example system illustrating the intersection between user devices and a context according to various embodiments.

FIG. 7 is a diagram of an example system 700 illustrating the intersection between user devices and a context according to various embodiments. For example, the system 700 may comprise any of the systems shown in FIGS. 5 and 6. Shown in FIG. 7 is a user device collection, referenced herein at 723, that includes a number of devices. These devices utilized by a user include, for example, a television 705, Personal Digital Assistant (PDA) 706, cell phone 701, and laptop computer (e.g., "laptop") 707. In most embodiments, the devices of FIG. 7 may include any one or more of the devices shown in FIGS. 5-6, including those operating as servers and clients.

In some example embodiments, one or more of these devices may participate in a context, referenced herein at 722, with other devices. These other devices include a computer 702 and a television 704. Within the context 722, the cell phone 701, computer 702, and television 704 may share an asset such as content or an application. In some example embodiments, one or more of the various devices in the context 722 may engage in context reporting through the generation of a context report 721. The context report 721 includes information relating to the devices and users participating in a context. The context report 721 is transmitted across the network 713 and is received by, for example, the distribution server 708. The context report 721 may be formatted using an eXtensible Markup Language (XML). The network 713 may be an Internet, a Local Area Network (LAN), a Wide Area Network (WAN), or some other suitable type of network as associated topology.

In some example embodiments, operatively connected to the network 713, is the previously referenced distribution server 708. Operatively connected includes a physical or logical connection. Operatively connected to the distribution server 708 may be a session management server 714, a context server 709, a content server 716, and an application server 719. These various servers (e.g., 708, 714, 709, and 716) may participate in a cloud computing paradigm. Additionally, these various servers may be implemented on a single computer system, or multiple computer systems. In some example embodiments, the distribution server is used to manage data flowing from the context 722, and to route this data.

The context server 709 includes an environment server and an interaction server. The interaction server tracks the interactions between devices in the context 722. Interactions include the sharing of assets between devices in the context 722. The environment server tracks the environment within which the interaction occurs. The environment includes data relating to the interaction such as the physical location of the devices participating in the context, the time and date of participation by the devices within the context 722, the amount and type of assets shared and other suitable information.

The session management server 714 is used to establish and manage a session. A session is an environment that is uniquely identified via a unique numeric identifier (e.g., a session ID) so as to regulate participants in the session. Participants may use a session identifier in combination with a user ID and/or device ID to facilitate their participation in a session. Operatively connected to the session management server 714 is a user profile and rights data store 711 that includes the session ID, the user ID, and/or device ID. Right include legal rights associated with an asset and its use. Additionally illustrated is a content server 716 that serves an asset in the form of content to context participants. Content includes images, video, audio-video, and text-based content. This content is stored in the content data base 715 that is operatively connected to the content server 716. Additionally, an application server 719 is shown that is used to serve applications to context participants. Applications include executables, code modules, software components, and software applications. These applications are stored in the content database 720. These applications may be used to enhance, augment, supplement, or facilitate the functionality of one or more of the devices participating in the context 722.

Figure 8:
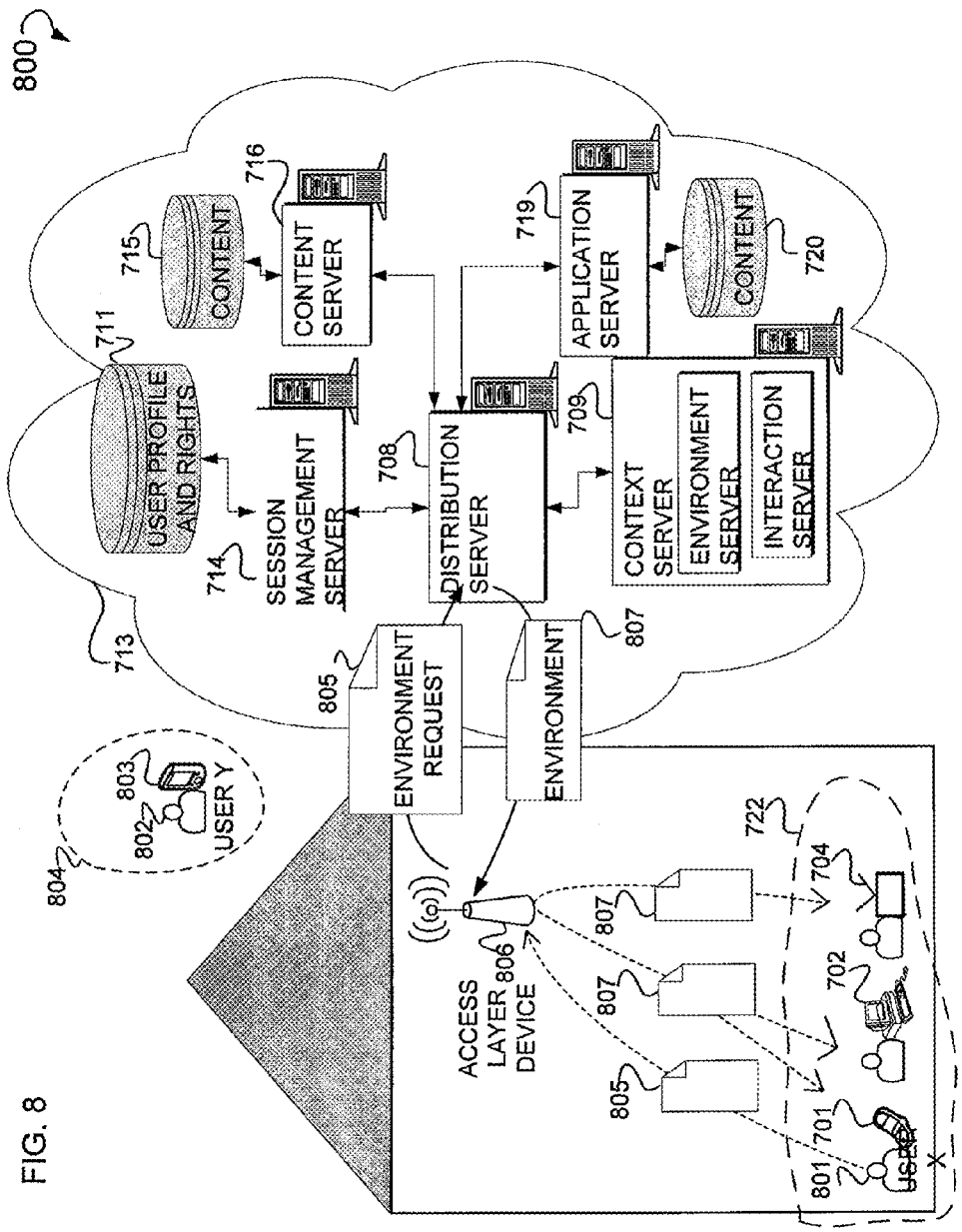
FIG. 8 is a diagram of an example system used to retrieve an environment for use in participating in a context according to various embodiments.

FIG. 8 is a diagram of an example system 800 used to retrieve an environment for use in participating in a context according to various embodiments. For example, the system 800 may comprise any of the systems shown in FIGS. 5 and 6. Shown in FIG. 8 is a user 801, referenced as "user x," that is associated with the cell phone 701. This user 801 is also associated with the user device collection 723. Further, shown is the computer 702 and television 704. As previously illustrated in FIG. 7, the cell phone 701, computer 702, and television 704 all participate in the context 722. This context may be in the form of a meeting occurring in a physical structure. In some example embodiments, the user 801 generates an environment request 805 that is received by an access layer device 806. This access layer device 806 transmits this environment request 805 across the network 713. The environment request 805 may include information relating to the relative physical location context participants, where information pertaining to this relative location is requested via the environment request 805. The distribution server 708, or one of the other servers (e.g., 708, 714, 709, and 716), may transmit an environment 807. This environment 807 may be distributed by the access layer device 806 to one or more of the context participants (e.g., the cell phone 701, computer 702, or television 704). Additionally, illustrated is a user 802, referenced as a "user y." This user 802 may have their own context 804 in which the PDA 803 participates. In some example embodiments, the content 804 and context 722 may be combined together to form a single context. This combination of contexts may occur where the PDA 803 joins the context 722.

Figure 9:
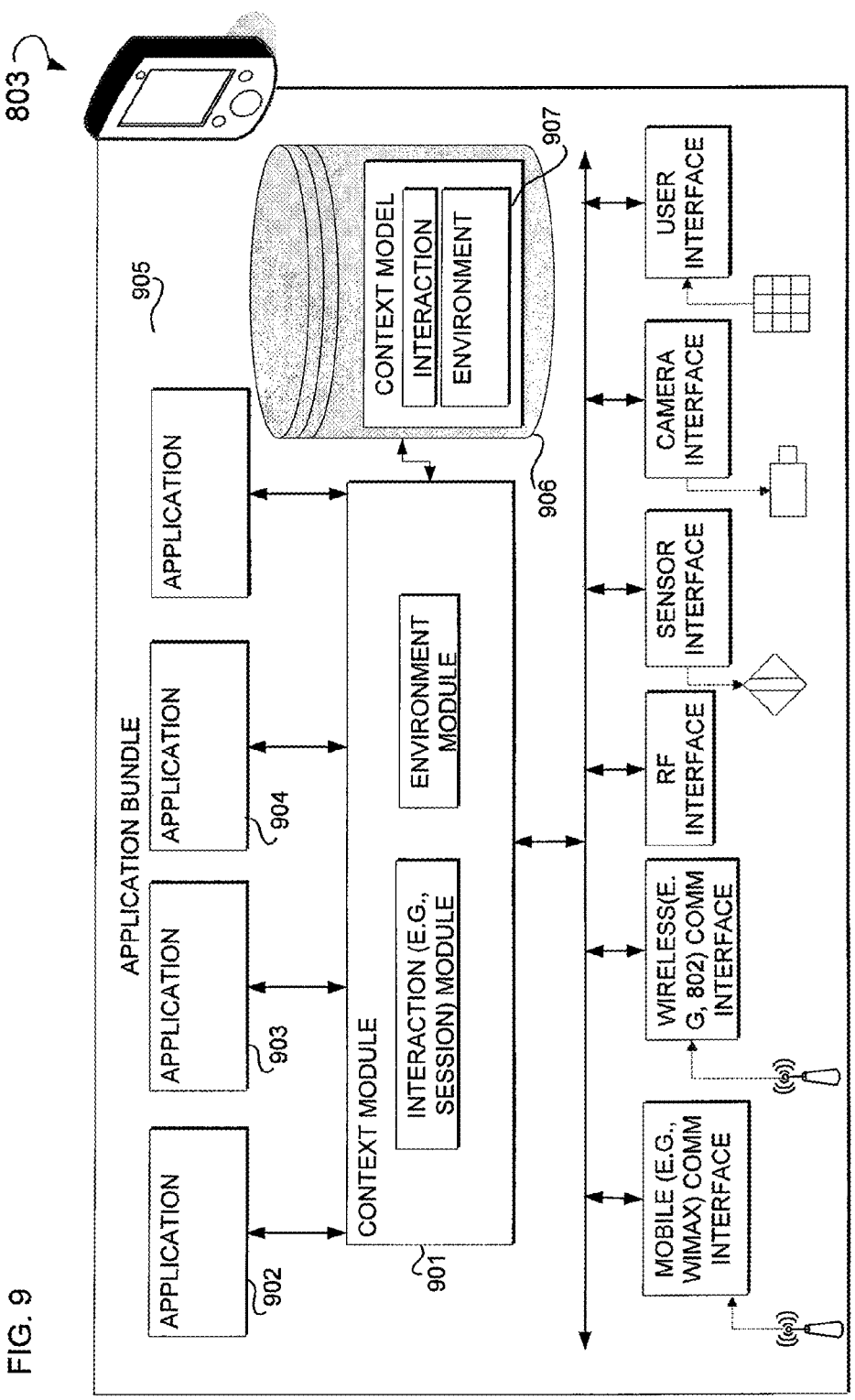
FIG. 9 is a block diagram of an example personal digital assistant (PDA) that includes functionality that enables the PDA to interact with other devices in a context, environment, or session, according to various embodiments.

FIG. 9 is a block diagram of an example PDA 803 that includes functionality that enables the PDA 803 to interact with other devices in a context, environment, or session according to various embodiments. For example, the PDA 803 may comprise any of the apparatus or systems of FIGS. 5-6, including servers or clients. Thus, the various blocks illustrated herein may be implemented by a computer system as hardware, firmware, or software.

Shown in FIG. 9 is a context module 901 that includes an interaction module. This interaction module may be used to establish a session in which devices may participate. Additionally, the context module may include an environment module that is used to generate the environment request 805, and to process the environment 807. Operatively connected to the context module 901 is an application bundle 905 (e.g., a suite of applications). Included in this application bundle 905 are applications 902 through 904. These applications may be used to process assets including content and applications. Process includes, for example, display, play, record, and execute. Example applications include FLASH™ of Adobe Systems, Inc., ACROBAT™ of Adobe Systems, Inc., PHOTOSHOP™ of Adobe Systems, Inc., or some other suitable application. Additionally, operatively connected to the context module 901 is a data store 906 that includes environment data 907 as part of a context model. Included as part of this context model may be session information including a session ID, user ID, and/or device ID. Additionally, included as part of this environment data 907 is the environment 807.

Figure 10:
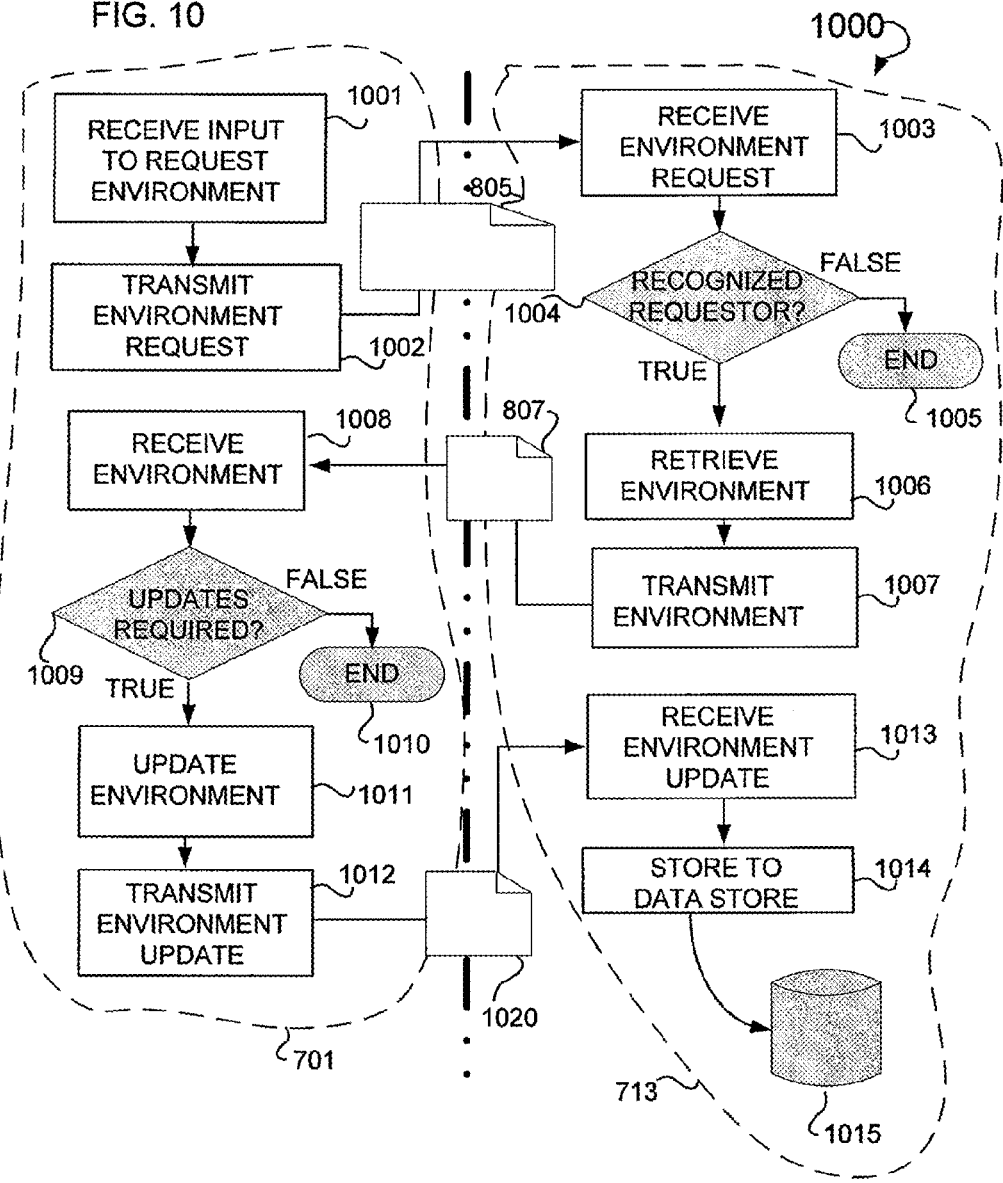
FIG. 10 is a dual-stream flow chart illustrating an example method used to request and receive an environment, and to generate an environment update according to various embodiments.

FIG. 10 is a dual-stream flow chart illustrating an example method 1000 used to request and receive an environment, and to generate an environment update according to various embodiments. As noted previously, any of the activities of method 411 may be added to or substituted for the operations shown in FIG. 10, which include operations 1001 through 1002, and 1008 through 1012. These various operations may be executed by the cell phone 701, or other suitable device that interacts in a context. Also shown are operations 1003 through 1007, and 1013 through 1014. These various operations are executed with the network 713 and the various servers (e.g., 708, 714, 709, and 716) illustrated therein. For example, the distribution server 708 may execute these various operations 1003 through 1007, and 1013 through 1014.

Shown is an operation 1001 that, when executed, receives input to request an environment. This input may be generated by an input device such as a touch screen, mouse, keyboard, light pen, or other suitable input device.

Operation 1002 is executed to transmit the environment request 805. Operation 1003, when executed, receives the environment request.

Decisional operation 1004 is executed to determine whether the device, and user associated therewith, is recognized as being able to request an environment. Where decisional operation 1004 evaluates to "false," a termination condition 1005 is executed as the requesting device or user is unrecognized. In case where decisional operation 1004 evaluates to "true," an operation 1006 is executed.

Operation 1006, when executed, retrieves an environment from, for example, the context server 109 and data store associated therewith (not pictured). Operation 1007 is executed to transmit the environment 807. Operation 1008 is executed to receive the environment 807.

In some example embodiments, the operation 1008 is executed by one of more of the interfaces shown in FIG. 9. A decisional operation 1009 is executed to determine whether an update of the environment 807 is required. In cases where decisional operation 1009 evaluates to "false," a termination condition 1001 is executed. In cases where decisional operation 1009 evaluates to "true," an operation 1011 is executed. Operation 1011 is executed to update the environment 807. This update may include additional location information relating to the cell phone 701, or other device participating in the context 722.

Operation 1012 is executed to transmit an environment update 1020. This environment update 1020 is received through the execution of operation 1013. Operation 1014 is executed to store the environment update 1020 into a data store 1015.

Implementing the apparatus, systems, and methods of the various embodiments may provide reviewers with a full history of comments as part of a collaboration workflow, even if the reviewers begin participating in the review after a significant amount of comment revision activity has occurred. Comment change history can be played back over time, or frozen at any particular instant in time. Reviewers may be more free to publish comments and updates to comments quickly, since comment revisions are now stored in the repository, where they can easily be retrieved. As a whole, these mechanisms may lead to conducting more efficient collaboration workflow processes that are also better understood by all of the participants.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of this description are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).).

Embodiments may, for example, be implemented as a stand-alone application (e.g., without any network capabilities), a client-server application or a peer-to-peer (or distributed) application. Embodiments may also, for example, be deployed by SaaS, Application Service Provider (ASP), or utility computing providers, in addition to being sold or licensed via traditional channels.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method comprising:
   receiving an updated comment added to a document that updates an original comment stored in a collaboration comment repository, the original comment being stored in conjunction with a comment series identifier and a first comment differentiation identifier, the comment series identifier and the first comment differentiation identifier being independent of a document version associated with the document;
   generating a second comment differentiation identifier to differentiate the updated comment from the original comment;
   storing at least a portion of the updated comment in the collaboration comment repository, the updated comment being stored in conjunction with the comment series identifier and the second comment differentiation identifier, the updated comment and the original comment being different versions of a same comment;
   utilizing a combination of the comment series identifier and one of the comment differentiation identifiers to uniquely identify a particular version of the same comment;
   displaying a time line of comments associated with a displayed document having a content portion and a comment portion, the time line including a first version indicator representing the original comment on a first part of the time line and a second version indicator representing the updated comment on a second part of the time line; and
   displaying the original comment on the time line of comments without changing the content portion of the displayed document, responsive to a user selection of the time line.

2. The method of claim 1, further comprising:
   maintaining all versions of the original comment, including the updated comment, in the collaboration comment repository.

3. The method of claim 1, further comprising:
   maintaining all versions of all comments associated with the document, including the original comment and the updated comment, in the collaboration comment repository.

4. The method of claim 1, further comprising:
   receiving a request to download at least one version of all comments associated with the document, all versions including the original comment and the updated comment, to a reviewer terminal.

5. The method of claim 1, further comprising:
   displaying a collaboration workflow state as a selected group of comments derived from all existing versions of all comments associated with the document, wherein the selected group is a group of comment versions in existence at a selected past time.

6. The method of claim 1, further comprising:
   displaying collaboration workflow progress as a series of collaboration workflow states associated with the document, wherein each of the collaboration workflow states comprises a group of comment versions in existence at a corresponding time, and wherein the collaboration workflow states are displayed in succession from an earlier time to a later time.

7. The method of claim 1, further comprising:
   displaying a time line with selectable comment versions in conjunction with displaying the updated comment.

8. A computer-readable medium, with instructions stored thereon, which when executed cause a computer to:
   receive an updated comment added to a document that updated an original comment stored in a collaboration comment repository, the original comment being stored in conjunction with a comment series identifier and a first comment differentiation identifier, the comment series identifier and the first comment differentiation identifier being independent of a document version associated with the document;
   generate a second comment differentiation identifier to differentiate the updated comment from the original comment;
   store at least a portion of the updated comment in the collaboration comment repository, the updated comment being stored in conjunction with the comment series identifier and the second comment differentiation identifier, the updated comment and the original comment being different versions of a same comment;
   utilize a combination of the comment series identifier and one of the comment differentiation identifiers to uniquely identify a particular version of the same comment;
   display a time line of comments associated with a displayed document having a content portion and a comment portion, the time line including a first version indicator representing the original comment on a first part of the time line and a second version indicator representing the updated comment on a second part of the time line; and
   display the original comment on the time line of comments without changing the content portion of the displayed document, responsive to a user selection of the time line.

9. The medium of claim 8, wherein the comment series identifier comprises a global unique identifier.

10. The medium of claim 8, wherein the comment differentiation identifier comprises a time stamp.

11. The medium of claim 8, wherein the instructions, when executed, cause a computer to:
    maintain the collaboration comment repository as a set of files corresponding to a set of reviewers cooperating in a shared review of the document, all versions of all comments from each one of the set of reviewers being segregated by reviewer.

12. The medium of claim 11, wherein the instructions, when executed, cause a computer to:
    maintain the set of files as a set of current comment version files and complete comment version files for each one of the set of reviewers.

13. The medium of claim 8, wherein the instructions, when executed, cause a computer to:
maintain at least a portion of the collaboration comment repository as a set of extensible markup language files.

14. An apparatus, comprising:
a display;
a processor-implemented comment management module to receive an updated comment added to a document that updates an original comment stored in a collaboration comment repository, the original comment being stored in conjunction with a comment series identifier and a first comment differentiation identifier, the comment series identifier and the first comment differentiation identifier being independent of a document version associated with the document, to generate a second comment differentiation identifier to differentiate the updated comment from the original comment, to store at least a portion of the updated comment in the collaboration comment repository, the updated comment being stored in conjunction with the comment series identifier and the second comment differentiation identifier, the updated comment and the original comment being different versions of a same comment, and to utilize a combination of the comment series identifier and one of the comment differentiation identifiers to uniquely identify a particular version of the same comment; and
a processor-implemented rendering module to cause the display to display the particular version of the same comment in association with a time line of comments associated with a displayed document having a content portion and a comment portion, the time line including a first version indicator representing the original comment on a first part of the time line and a second version indicator representing the updated comment on a second part of the time line, and to display the original comment on the time line of comments without changing the content portion of the displayed document, responsive to a user selection of the time line.

15. The apparatus of claim 14, further comprising:
a user input device to select display of the updated comment or the original comment from a time line.

16. The apparatus of claim 14, further comprising:
a storage element to store the collaboration comment repository.

17. The apparatus of claim 14, the processor-implemented comment management module to maintain reviewer preferences comprising a selection between downloading only current comment versions or downloading all comment versions including the original comment and the updated comment.

18. The apparatus of claim 14, further comprising:
a processor-implemented page description language document presentation application to include the processor-implemented rendering module.

19. A system comprising:
a server device;
a storage element coupled to the server device; and
a client device communicatively coupled to the server device, at least one of the client device or the server device comprising a display, a processor-implemented comment management module, and a processor-implemented rendering module, the processor-implemented comment management module operable to receive an updated comment added to a document that updates an original comment stored in a collaboration comment repository, the original comment being stored in conjunction with a comment series identifier and a first comment differentiation identifier, the comment series identifier and the first comment differentiation identifier being independent of a document version associated with the document, to generate a second comment differentiation identifier to differentiate the updated comment from the original comment, to store at least a portion of the updated comment in the collaboration comment repository stored on the storage element, the updated comment being stored in conjunction with the comment series identifier and the second comment differentiation identifier, the updated comment and the original comment being different versions of a same comment, and to utilize a combination of the comment series identifier and one of the comment differentiation identifiers to uniquely identify a particular version of the same comment, and the processor-implemented rendering module to cause the display to display the particular version of the same comment in association with a time line of comments associated with a displayed document having a content portion and a comment portion, the time line including a first version indicator representing the original comment on a first part of the time line and a second version indicator representing the updated comment on a second part of the time line, and to display the original comment on the time line of comments without changing the content portion of the displayed document, responsive to a user selection of the time line.

20. The system of claim 19, the portion of the updated comment comprising at least some properties of the updated comment, including changed properties of the original comment.

21. The system of claim 19, further comprising:
a network to transmit an indication to the comment management module to synchronize or publish all comments, including the updated comment, in the collaboration comment repository.

22. A computer-implemented method comprising:
executing instructions on a specific apparatus so that binary digital electronic signals representing an updated comment added to a document are received, the updated comment and an original comment being different versions of a same comment stored in a collaboration comment repository, wherein the updated comment updates the original comment, the original comment being stored in the collaboration comment repository in conjunction with a comment series identifier and a first comment differentiation identifier, the comment series identifier and the first comment differentiation identifier being independent of a document version associated with the document;
executing instructions on the specific apparatus so that binary digital electronic signals representing a second comment differentiation identifier are generated, wherein the comment differentiation identifier is operable to differentiate the updated comment from the original comment;
executing instructions on the specific apparatus so that binary digital electronic signals are stored in the collaboration comment repository, wherein the binary digital electronic signals represent at least a portion of the updated comment, the comment series identifier, and the second comment differentiation identifier;

utilizing a combination of the comment series identifier and one of the comment differentiation identifiers, executing instructions on the specific apparatus so that a particular version of the same comment is uniquely identified; and communicating the at least a portion of the particular version of the same comment to a display apparatus, the particular version of the same comment being associated with a time line of comments associated with a displayed document having a content portion and a comment portion, the time line including a first version indicator representing the original comment on a first part of the time line and a second version indicator representing the updated comment on a second part of the time line, the time line operable to display the original comment on the time line of comments without changing the content portion of the displayed document, responsive to a user selection of the time line.

\* \* \* \* \*